US008879586B2

(12) United States Patent
Tzeng

(10) Patent No.: US 8,879,586 B2
(45) Date of Patent: Nov. 4, 2014

(54) INBAND TIMESTAMPING

(71) Applicant: Broadcom Corporation, Irvine, CA (US)

(72) Inventor: Jeffrey Tzeng, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 119 days.

(21) Appl. No.: 13/722,985

(22) Filed: Dec. 20, 2012

(65) Prior Publication Data

US 2014/0177653 A1 Jun. 26, 2014

(51) Int. Cl.
*H04J 3/06* (2006.01)
(52) U.S. Cl.
CPC .................................... *H04J 3/0635* (2013.01)
USPC ....................................................... 370/503
(58) Field of Classification Search
USPC .......... 370/375, 378, 386–388, 412–419, 503
See application file for complete search history.

(56) References Cited

U.S. PATENT DOCUMENTS

| 7,689,854 | B2 * | 3/2010 | Ilnicki et al. | 713/400 |
| 8,576,883 | B2 * | 11/2013 | Lansdowne | 370/503 |
| 8,718,482 | B1 * | 5/2014 | Roberts et al. | 398/161 |
| 2012/0128011 | A1 * | 5/2012 | Holmeide et al. | 370/474 |
| 2013/0028265 | A1 * | 1/2013 | Ronchetti et al. | 370/400 |

\* cited by examiner

*Primary Examiner* — Frank Duong
(74) *Attorney, Agent, or Firm* — Sterne, Kessler, Goldstein & Fox PLLC

(57) ABSTRACT

Embodiments are directed to timing synchronization between network nodes, such as, for example, based upon IEEE 1588. Example embodiments provide for a node in a IEEE 1588 message exchange to obtain the T3 timestamp without using its host interface to access the physical layer. Methods and systems include aspects of determining an egress timestamp corresponding to a time at which a first packet is transmitted from a physical interface of a first network entity on to a network media, storing the egress timestamp in a memory associated with the physical interface, receiving a second packet at the physical interface, retrieving the egress timestamp from the memory based upon the second packet, and updating the second packet with the retrieved egress timestamp. Embodiments may further include providing the updated second packet for protocol processing in the first network entity, or transmitting the updated second packet from the physical interface on to a network media.

20 Claims, 7 Drawing Sheets

INBAND TIMESTAMPING

BACKGROUND

1. Field of the Invention

Embodiments of this invention are related generally to synchronization between network entities.

2. Background Art

Timing and frequency synchronization among network entities that communicate with each other is an important issue in network performance. The accuracy of the synchronization between network nodes affects the performance of systems attached to the network and also the overall performance of the network. The IEEE 1588 protocol, referred to as the Precision Time Protocol (PTP) is a technique for providing robust cost-effective time synchronization for the distributed systems. IEEE 1588 is designed for substantially higher accuracy levels (e.g. on the order of submicroseconds) than the older network synchronization protocol known as the Network Time Protocol (NTP).

IEEE 1588 is based on packet exchanges between network entities (network nodes) defined as masters and as slaves (also referred to as master nodes and slave nodes, respectively). Each slave synchronizes its clock ("slave clock" or SC) to the clock of a master. To enhance fault tolerance, an election process may determine one among a plurality of masters to provide the accurate clock at any particular instant to the slaves. The master that is selected to provide the accurate clock is referred to as a grandmaster or GM.

IEEE 1588 implementations require that every participating network interface (e.g. port) takes very accurate timestamps of selected packet ingress and/or egress, and manages precisely synchronized time. By taking timestamps at the edge of the physical layer for a network interface very close to the network medium, the time difference between when a packet is transmitted from a first node to that packet being received at second node can be minimized.

For large networks however, particularly when packets traverses multiple hops from a source to a destination, the desired high accuracy may not be achieved without considering the packet queuing delays at intermediate nodes. Data traffic may cause long delays (on the order of milliseconds) of IEEE 1588 packets because the same network resources are shared by data traffic and IEEE 1588 packets. The latest version of the IEEE 1588 defines a transparent clock (TC) associated with respective intermediate nodes between a master and a slave. A network element that operates as a TC measures the residence time (e.g. queuing delay) that the IEEE 1588 packets experience at the network element itself, and may record that residence time in respective packets. Each IEEE 1588 slave then eliminates the synchronization error that results from residence time by using the residence time information found in the packets.

However, implementations of IEEE 1588 that are in common use at present have inefficiencies in notifying the network entities of the timestamps. Such inefficiencies can result in the IEEE 1588 implementation imposing a high burden upon processing resources at network nodes. Therefore, it is desired that more efficient techniques for network time synchronization are available.

BRIEF DESCRIPTION OF THE DRAWINGS/FIGURES

Reference will be made to the embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE INVENTION

While the present invention is described herein with reference to illustrative embodiments for particular applications, it should be understood that the invention is not limited thereto. Those skilled in the art with access to the teachings herein will recognize additional modifications, applications, and embodiments within the scope thereof and additional fields in which the invention would be of significant utility.

Embodiments provide for efficient timing synchronization between entities connected to a network. Some embodiments can be used to achieve synchronization in accordance with IEEE 1588 in any packet-switched network (for this disclosure, the term packet is used to include layer 3 packets and layer 2 frames, and the term packet-switched network is used to include frame-switched networks). Some embodiments are directed to reducing the processing overhead placed upon the host processor and delays incurred by synchronization-related processing. In an example embodiment, the egress timestamp of an outgoing message is saved in a memory associated with the physical interface through which the message egresses, and upon receiving the response message corresponding to the transmitted message the saved egress timestamp is recorded in the header of the response message before the response message is passed up the protocol stack. The egress timestamp corresponds to the time the message is transmitted on the physical network medium from the physical interface.

By saving the egress timestamp until the corresponding response is received and then recording the egress timestamp in the response, embodiments provide an efficient technique for informing the protocol processing entities of the egress and ingress timestamps of a request message. The egress timestamp can be inserted as a field in the header of selected protocol packets so that it is communicated inband, avoiding costs associated with additional data that changes the size of packets. By this technique, the requirement for relatively slow host interface (e.g. Media Independent Interface (MII) and/or Management Data Input/Output (MDIO) interface) access to a memory associated with the physical interface is reduced or eliminated.

The embodiments below are described primarily with respect to IEEE 1588. However, the embodiments and the features described herein can also be applied to timing and/or frequency synchronization techniques other than those consistent with IEEE 1588. Some embodiments can be applied to any technique which requires a protocol processing entity within a network node to acquire a precise timestamp of when a packet exits its physical interface.

Figure 1A:
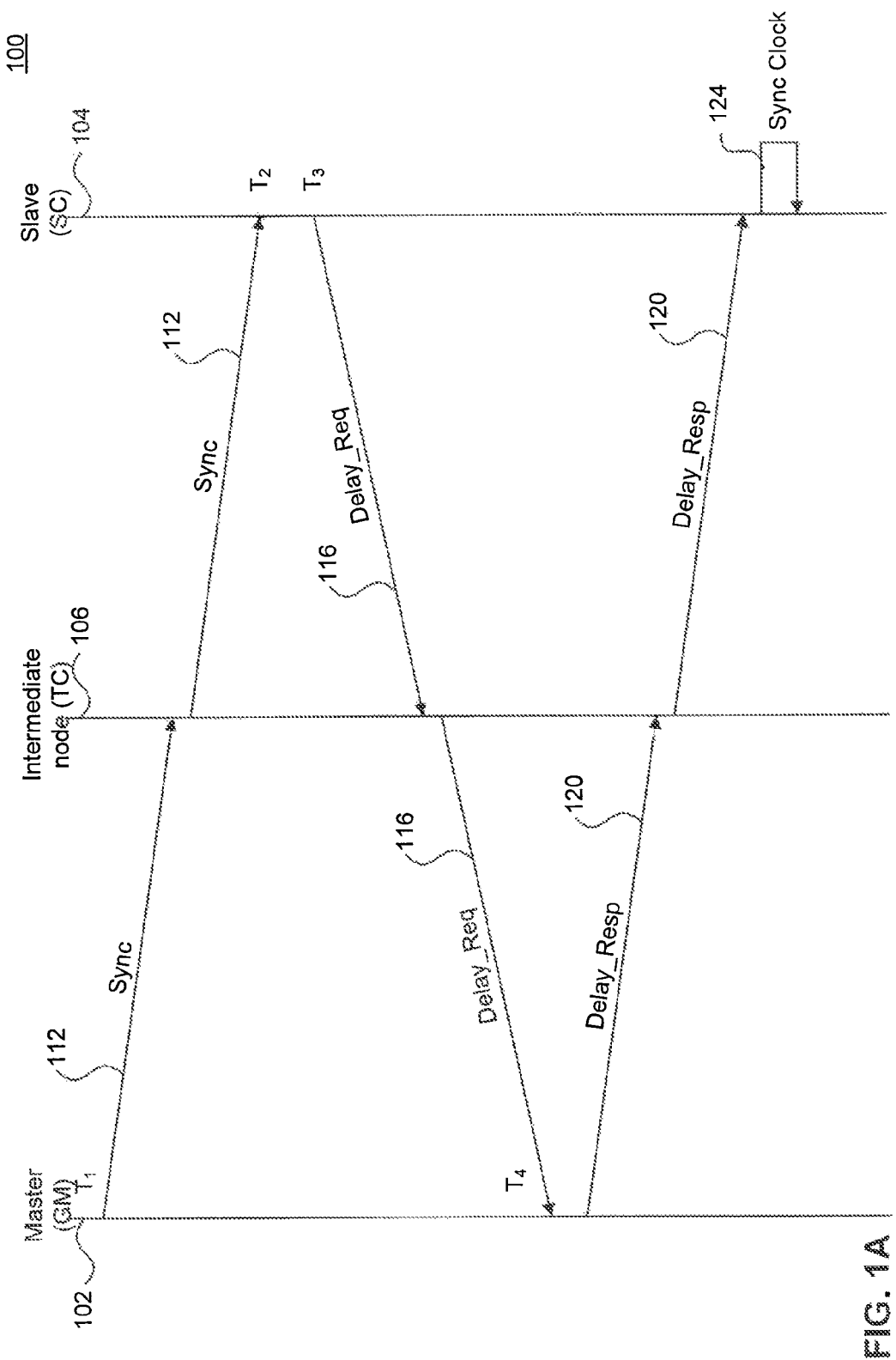
FIG. 1A illustrates a message sequence for timing synchronization, in accordance with an embodiment.

FIG. 1A illustrates a sequence diagram 100 of a message exchange for timing synchronization, in accordance with an embodiment. The illustrated message exchange involves three nodes: a master node (GM) 102, an intermediate node 106 referred to as a transparent clock (TC), and a slave node 104 with a SC to be synchronized with the GM.

The message exchange, in accordance with IEEE 1588, begins with SYNC 112 packet transmitted by master 102 to slave 104. SYNC 112 may be intercepted by one or more intermediate nodes 106. Thus, SYNC 112 is transmitted by master 102 and may either be directly received by slave 104 or may first traverse through one or more intermediate nodes 106 before being forwarded to slave 104.

SYNC 112 includes a timestamp T1 which represents the time SYNC 112 was transmitted by master 102 onto the network (e.g. egress start of packet time). T1 can be included in the body of the SYNC 112 packet. IEEE 1588 requires very high (e.g. submicrosecond or nanosecond) accuracy, which requires that T1 is captured at or very close to the actual time at which the message is physically transmitted on the network. Embodiments, therefore, utilize hardware at or very close to the physical interface to capture the timestamp to eliminate or minimize the difference in time between the timestamp and the actual transmission of the packet on the network. If the timestamp is captured before the actual transmission of the packet (e.g. at the MAC layer), then the captured timestamp in SYNC 112 may only be an approximation of the actual egress time. This is because there may be a delay before the packet is actually transmitted on the network medium. For example, when the network medium is an Ethernet, the actual transmission of the packet (e.g. the actual time at which the transmission of the packet from the physical interface onto the network is completed) is dependent on the collision sense multiple access/collision detection (CSMA/CD) protocol and can substantially differ from any timestamp of the packet taken before the actual transmission.

In embodiments where T1 is captured in hardware close to the physical interface at the start of the SYNC 112 packet, T1 may be recorded in the body just before the packet completes transmission.

Intermediate node 106 forwards SYNC 112 to slave 104. SYNC 112 includes timestamp T1. SYNC 112 may include a correction value when it reaches slave 104, which represents the delay (e.g. queuing delay) experienced by the packet at intermediate node 106 and other intermediate nodes, if any. The queuing delay may be determined by intermediate node 106 (or other intermediate node) by any internal mechanism. For example, a timestamp may be taken upon ingress of the packet to intermediate node 106. A timestamp can again be taken upon egress of the packet from intermediate node 106, and the difference of the timestamps may be determined as the delay (also referred to as "residence time") at intermediate node 106, which is then recorded as the correction value. The correction value may be recorded as a field in the header of SYNC 112.

When multiple intermediate nodes 106 are encountered in the path between master and slave, each intermediate node 106 adds the delay encountered by the packet in the correction value. Thus, the correction value represents an aggregate residence time of the packet.

Intermediate node 106 may itself also act as a slave and use T1 to synchronize itself to master 102. For example, in some embodiments, intermediate node 106 operates as a slave on the physical interface through which packets are received from master 102, and operates as a master on the physical interface through which packets are forwarded to slave 104.

When SYNC 112 reaches slave 104, a timestamp T2 is captured upon ingress. T2 represents the ingress start of packet time for SYNC 112 at slave 104. For enhanced accuracy, T2 is captured at or very close to the physical interface of slave 104 upon reading the start of packet from the network medium. T2 is then recorded in the SYNC 112 packet. According to an embodiment, T2 can be recorded in the header of SYNC 112. Thereafter, SYNC 112 with T1 and T2 recorded is forwarded up the protocol stack of slave 104 to the protocol processing modules, such as, for example, IEEE 1588 protocol processing module.

Slave 104 may adjust T1 and/or T2 based upon the correction value that represents the residence times encountered by the packet enroute from master 102 to slave 104. As noted above, the correction value (e.g. the aggregate correction value) is recorded by the intermediate nodes in the SYNC 112 header.

The adjustments to T1 and/or T2 based upon the correction value are performed so that T2 can be related to T1 in accordance with T2=T1+offset+propagation delay, where 'offset' refers to the offset of the slave from the master, and where 'propagation delay' is the cumulative propagation delay experienced by SYNC 112 enroute from master to slave. According to an embodiment, the adjustments include updating T2 by subtracting the correction value from T2.

The goal of the synchronization is to reduce or eliminate the offset. In order to determine the offset, the propagation delay must be determined. In order to determine the propagation delay between the slave and master, the slave creates a "delay request" (DELAY_REQ) 116 packet and transmits to the master. A timestamp T3 is captured upon the egress of DELAY_REQ 116 from the slave. T3 represents the egress start of packet time of DELAY_REQ 116.

DELAY_REQ 116 may reach master 102 directly, or via one or more intermediate nodes intermediate node 106. When DELAY_REQ 116 is first received, intermediate node 106 may include the delay incurred by the packet at that node in a correction value recorded in that packet. As in the case of the SYNC packet traversing an intermediate node (as described above), the correction value includes the residence times experienced by the packet at one or more intermediate packets.

DELAY_REQ 116, having the recorded correction value, is forwarded by intermediate node 106 to master 102.

Upon ingress of DELAY_REQ 116, master 102 captures a timestamp T4. The timestamp T4 represents the time at which DELAY_REQ 116 entered master 102.

Responsive to the receipt of DELAY_REQ 116, master 102, creates a "delay response" DELAY_RSP 120 message and transmits to slave 104. DELAY_RSP 120 includes the T4 timestamp. According to an embodiment, DELAY_RSP 120 includes T4 as captured upon ingress of DELAY_REQ 116 and the correction value as recorded in DELAY_REQ 116 (e.g. T4 is not updated by the master based upon the correction value). According to another embodiment, T4 is updated by the master based upon the correction value, and the updated T4 is included in DELAY_RSP 120.

DELAY_RSP 120 may reach slave 104 directly, or via one or more intermediate nodes intermediate node 106.

Upon receiving DELAY_RSP 120, slave 104 has received timestamps T1, T2, T3 and T4. Based upon these timestamps the slave clock can be synchronized 124 to that of the master. If any of the timestamps need to be adjusted based upon a corresponding correction value (e.g. representing residence time), then such adjustments are made before the synchronization. In an example embodiment, the difference between the SC and GM can be determined as $((T_2-T_1)+(T_4-T_3))/2$.

Figure 1B:
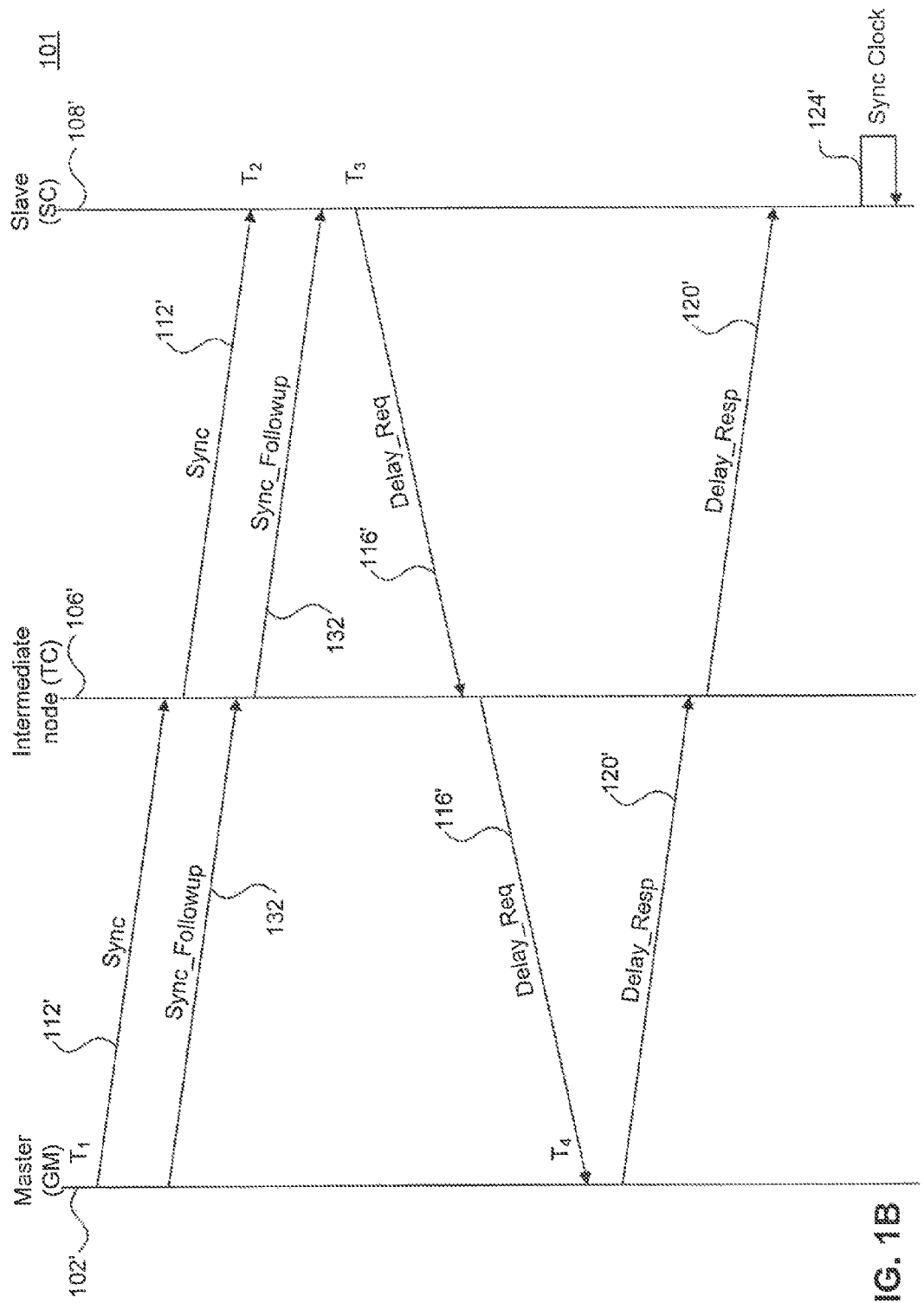
FIG. 1B illustrates another message sequence for timing synchronization, in accordance with an embodiment.

FIG. 1B illustrates a sequence diagram 101 of another message exchange for timing synchronization, in accordance with an embodiment. Message exchange 101 is between the same network entities (e.g. master and slave, and none or one or more intermediate nodes) as message exchange 100, and is also directed to synchronizing the slave.

Accordingly message exchange 101 includes a SYNC 112' between a master 102' and slave 104'. SYNC 112' corresponds to SYNC 112 between master 102 and slave 104 described in relation to sequence 100. Likewise, sequence 101 includes DELAY_REQ 116' and DELAY_RSP 120' which correspond respectively to DELAY_REQ 116 and DELAY_RSP 120 shown in sequence 100.

However, in addition to messages corresponding to those in sequence 100, sequence 101 also includes a "sync followup" (SYNC_FOLLOWUP) 132 transmitted by master 102' immediately following the SYNC 112'. SYNC_FOLLOWUP 132 has recorded in it, the timestamp T1 captured when SYNC 112' was transmitted.

Thus, in embodiments where SYNC 112' and SYNC_FOLLOWUP 132 are transmitted by the master (e.g. known as "two-step" PTP), the actual timestamp T1 is transmitted using the SYNC_FOLLOWUP 132, and SYNC 112' may not include a value for T1. SYNC_FOLLOWUP 132 may reach slave 104 directly, or via one or more intermediate nodes TC 106.

Figure 2:
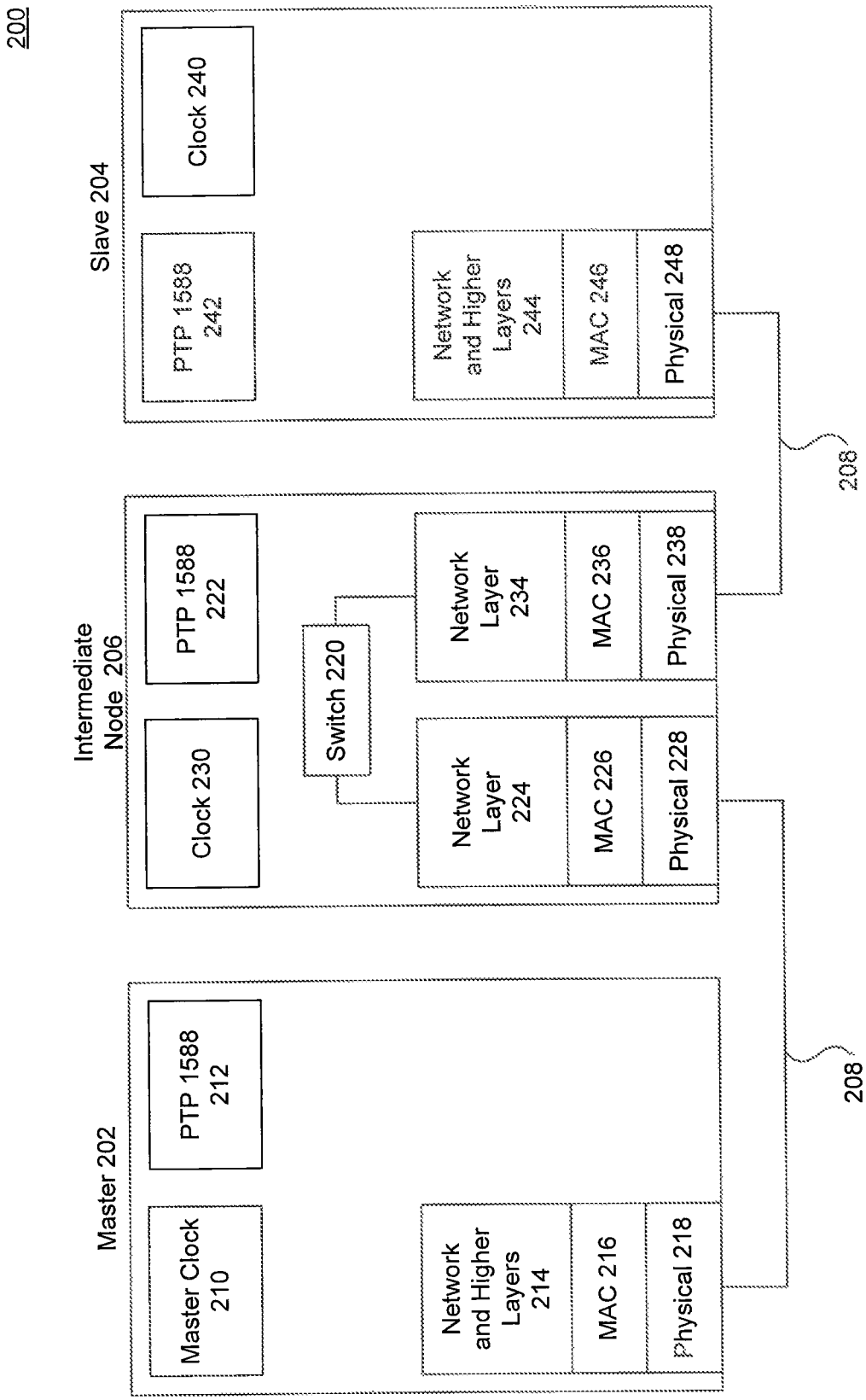
FIG. 2 illustrates a system for synchronizing time between network entities, in accordance with an embodiment.

FIG. 2 illustrates a system 200 for synchronizing time between network entities, in accordance with an embodiment. The illustrated system includes a master 202, slave 204, and intermediate node (e.g. network switch) 206 which interconnects master 102 and slave 204.

Master 202 provides the clock to which slave 204, and, in some embodiments, switch 206 synchronizes. Master clock 210 may be based upon a global positioning system (GPS) clock or other accurate clock. Master 202 may include, for example, a GPS receiver (not shown) and GPS clock adjust circuitry (not shown) which may be used by master 202 to keep master clock 210 in synchronization with a highly accurate external GPS clock. Master 202 may include one or more computers, such as a server computer or cluster of server computers. Master 202 is coupled to slave 204 and one or more intermediate nodes 206 over a network 208. Network 208 may include any network technology, such as, but not limited to Ethernet. Master 202 operates in accordance with the descriptions above related to one or both master 102 and master 102'.

Master 202 includes a network protocol stack including a physical layer 218, a media access control (MAC) layer 216, and network layer and above 214. Master 202 also includes a IEEE 1588 protocol module 212. Each of the modules 212-218 can be implemented in software, firmware, hardware or a combination thereof.

IEEE 1588 protocol module 212 operates to provide the generation and processing of messages, and maintaining of state related to PTP at master 202. IEEE 1588 protocol module 212 may include functions, such as timestamping and/or classification, implemented in the hardware in the physical interface and other functions implemented in software.

Network (layer 3) and higher layers 214 includes operations to process internet protocol (IP) and higher layer (e.g. transport layer), and routing and forwarding. MAC 216 includes operations to process layer 2 packet headers and protocols. Physical layer 218 includes operations to process layer 1 protocol aspects and receipt/transmission of packets from/to the network media. Physical layer 218 may be implemented in a PHY, such as that described below in relation to FIG. 4. Protocol modules 212-218 operate in combination to provide master 202 with operations described in relations to master 102 and 102' illustrated in FIGS. 1A and 1B.

Slave 204 includes a network protocol stack including a physical layer 248, a media access control (MAC) layer 246, and network layer and above 244. Slave 204 also includes a IEEE 1588 protocol module 242. Each of the modules 242-248 can be implemented in software, firmware, hardware or a combination thereof.

IEEE 1588 protocol module 242 operates to provide the generation and processing of messages, and maintaining of state related to PTP at slave 204. IEEE 1588 protocol module 242 may include functions, such as timestamping and/or classification, implemented in the hardware in the physical interface and other functions implemented in software. IEEE 1588 module 242 operates to maintain synchronization of slave clock 240 with a master clock, such as master clock 210.

Network (layer 3) and higher layers 244 includes operations to process internet protocol (IP) and higher layer (e.g. transport layer), and routing and forwarding. MAC 246 includes operations to process layer 2 packet headers and protocols. Physical layer 248 includes operations to process layer 1 protocol aspects and receipt/transmission of packets from/to the network media. Physical layer 248 may be implemented in a PHY, such as that described below in relation to FIG. 4. Protocol modules 242-248 operate in combination to provide slave 204 with operations described in relations to slave 104 and 104' illustrated in FIGS. 1A and 1B.

Intermediate node 206 includes a network protocol stack including a physical layer 228 and 238, a media access control (MAC) layer 226 and 236, and network layer and above 224 and 234. Intermediate node 206 includes a switch 220 that operates to route/switch incoming packets to an outgoing interface. For example, packets from master 202 to slave 204 are received on a first physical interface and switched using switch 220 to a second physical interface through which the packet is transmitted to slave 204. Intermediate node 206 also includes a IEEE 1588 protocol module 222. Each of the modules 220-228 and 234-238 can be implemented in software, firmware, hardware or a combination thereof.

IEEE 1588 protocol module 222 operates to provide the determination of residence time of PTP packets and update of timestamps at intermediate node 206. IEEE 1588 protocol module 222 may include functions, such as timestamping and/or classification, implemented in the hardware in the physical layer (e.g. PHY) and other functions implemented in software. Note that where intermediate node 206 can be a master and/or slave, in addition to the above operations of module 222, operations described with respect to modules 212 and 242 such as, for example, generation and processing of messages, and maintaining of state related to PTP, can be provided by module 222.

Network (layer 3) and higher layers 224 and 234 includes operations to process internet protocol (IP) and higher layer (e.g. transport layer), and routing and forwarding. MAC 226 and 236 includes operations to process layer 2 packet headers and protocols. Physical layer 228 and 238 includes operations to process layer 1 protocol aspects and receipt/transmission of packets from/to the network media. Physical layer 228 and 238 may be implemented in a PHY, such as that described below in relation to FIG. 4. Protocol modules 222-226 and 234-236 operate in combination to provide intermediate node 206 with operations described in relations to intermediate node 106 and 106' illustrated in FIGS. 1A and 1B.

Figures 3A, 3B:
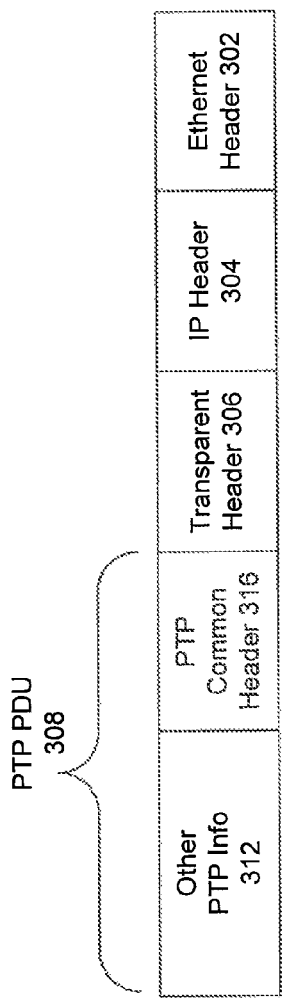
FIG. 3A illustrates format of a Precision Time Protocol (PTP) packet described in IEEE 1588, in accordance with an embodiment.
FIG. 3B illustrates format of a common header of a PTP packet, in accordance with an embodiment.

FIG. 3A illustrates a format for a Precision Time Protocol (PTP) packet 300 described in IEEE 1588, in accordance with an embodiment. Packet 300 illustrates a sequence of headers of the different protocol layers that are attached to the payload of PTP data 312. PTP is located above the transport layer (e.g. user datagram protocol (UDP)) of the Open Systems Interconnect (OSI) protocol stack. PTP data 312 includes a message format for each type of PTP message such as, but not limited to, SYNC, SYNC_FOLLOWUP, DELAY_REQ and DELAY_RSP.

PTP data 312, for any type of PTP message, is preceded by a PTP common header 316. The format of the common header is described in relation to FIG. 3B. The PTP data 312 and common header 316 forms a PTP protocol data unit (PDU) 308. The PTP PDU 308 may be processed by the respective PTP protocol processing modules (e.g. 212, 222, and 242 described above) in master, slave and/or intermediate node network entities participating in the IEEE 1588 synchronization.

PTP PDU 308 is preceded by a transport protocol header 306. The transport protocol header indicates port level information for protocol processing of packets. In IEEE 1588 the transport protocol header 306 may include a user datagram protocol (UDP) header.

The transport protocol header 306, is preceded by a network protocol header 304 and MAC layer header 302. In the illustrated embodiment of an IEEE 1588 packet, network header 304 may be a IP header and MAC header may be an Ethernet header.

FIG. 3B illustrates format of a common header 316 of a PTP packet, in accordance with an embodiment. Common header 316, for example, is attached to each PTP message in accordance with IEEE 1588.

Common header 316 includes three reserved fields: reserved(0) 322, reserved(1) 324 and reserved(2) 326. The use of the reserved fields are not defined in IEEE 1588.

Common header 316 also includes a messageType 328 and controlField 330. MessageType 328 indicates the type of PTP message, and controlField 330 indicates a particular operation.

The common header 316 also includes the fields domainNumber 332, sourcePortIdentity 334 and sequenceIdentifier 336. DomainNumber 332 identifies a unique synchronization domain. SourcePortIdentity 334 uniquely identifies a source port. SequenceIdentifier 336 identifies the cycle of synchronization message exchange.

In addition, a correctionField 340 is also included in the common header 316. The correction field 340 includes the residence times determined by the intermediate nodes.

Figure 4:
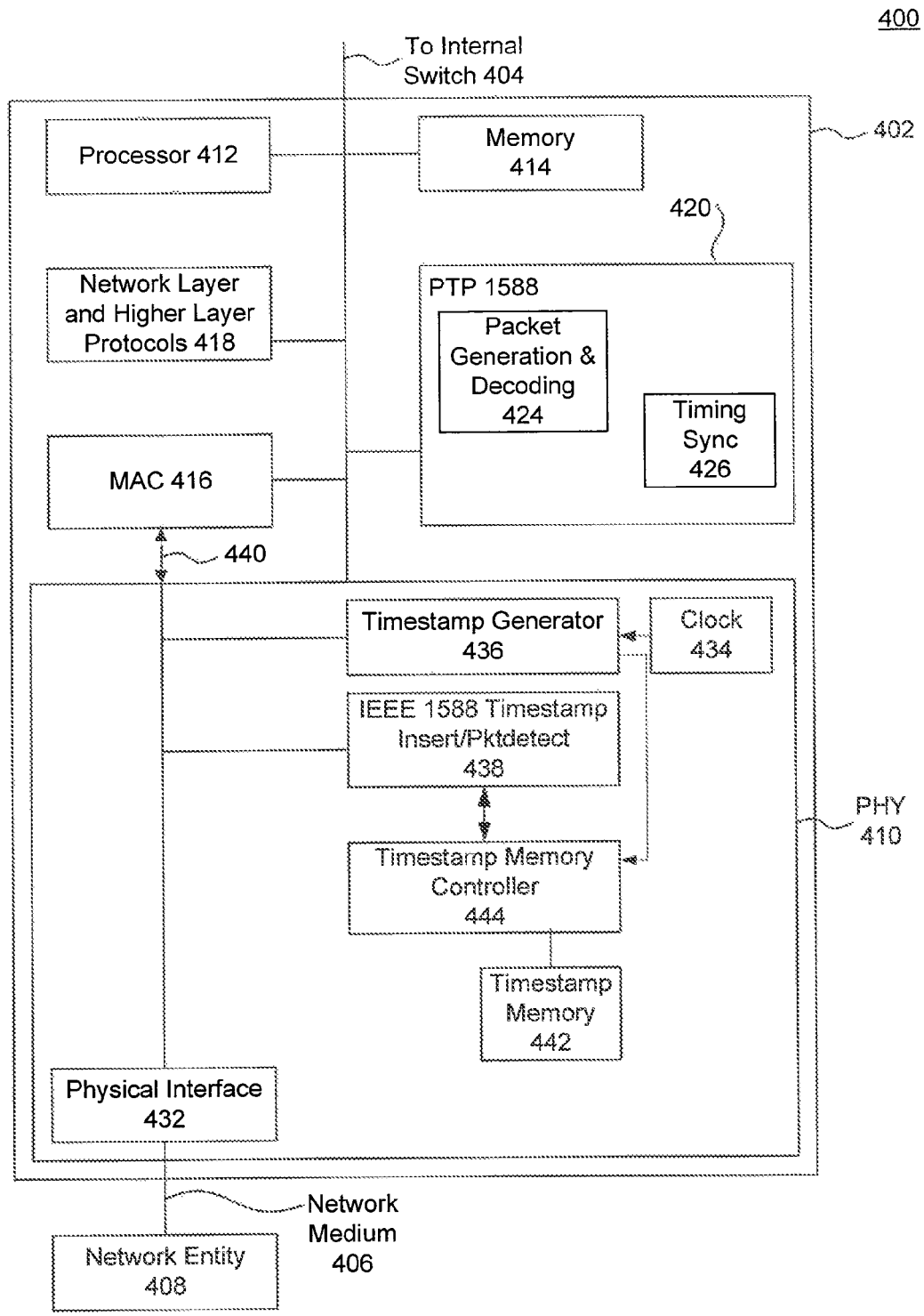
FIG. 4 illustrates a system for time synchronization of network entities, in accordance with an embodiment.

FIG. 4 illustrates a system 400 for time synchronization of network entities, in accordance with an embodiment. System 400 illustrates a line card 402 in a network entity participating in IEEE 1588 timing synchronization.

Line card 402 is coupled to an internal switch (not shown) via at least one communications bus 404. The internal switch and bus 404 interconnects line card 402 to other line cards and processing devices of a networking device.

Line card 402 is configured to be connected to a network medium 406, such as, but not limited to, an Ethernet network. Network medium 406 interconnects line card 402 to other network entities 408, such as, for example, entities that perform as masters, slaves, and/or intermediate nodes in a IEEE 1588 synchronization network.

Line card 402 includes a network physical layer implementation (referred to as PHY) 410, a processor 412, a local memory 414, a MAC protocol module 416, a network and higher layer protocol module 418, a IEEE 1588 protocol module 420, and a communications infrastructure (e.g. bus) interconnecting 410-420.

Processor 412 may include any processor that operates to execute sequences of instructions. Processor 412 may include, for example, a central processing unit (CPU), field programmable gate array (FPGA), application specific integrated circuit (ASIC), or digital signal processor (DSP).

Memory 414 includes a volatile storage memory local to line card 402. Memory 414 may include a dynamic random access memory (DRAM), static random access memory (SRAM), flash memory, or other type of memory. Memory 414 may be utilized by processor 412 to store instructions for execution, configurations, and intermediate results of computations.

MAC protocol module 416 can be implemented in hardware, software, or as a combination thereof. MAC protocol module 416 operates to provide the media access control processing for transmitting and receiving packets from network medium 406.

Network and higher layer protocol module 418 too can be implemented in hardware, software, or as a combination thereof. Network and higher layer protocol module 418 operates to provide the network and higher protocol layer processing for transmitting and receiving packets from network medium 406. For example, generation and reading of packet headers for network layer and above, and routing, are example operations that may be performed by, or assisted in, network and higher layer protocols module 418.

IEEE 1588 protocol module 420 provides for operations required in accordance with the IEEE 1588 protocol. IEEE 1588 protocol module 420 includes a PTP packet generation and decoding module 424 and a timing synchronization module 426. PTP packet generation and decoding module 424 provides for generating packets for defined IEEE 1588 events (e.g. SYNC, DELAY_REQ and DELAY_RSP), and for decoding the IEEE 1588 packets that are received. Timing synchronization module 426 provides for determining and initiating the adjustment that is to be made to a local clock based upon the timestamps collected based upon the IEEE 1588 synchronization message exchange.

PHY 410 includes a physical interface 432, a clock 434, a timestamp generator 436, and a IEEE 1588 timestamp insert and packet detection module 438. PHY 410 also includes a timestamp memory 442. Access to timestamp memory 442 may be controlled by timestamp memory controller 444. According to an embodiment, PHY 410 is a chip. According to another embodiment, PHY 410 may be integrated, for example, with at least some MAC layer operations.

Physical interface 432 operates to transmit packet to, and receive packets from, the network medium 406. According to an embodiment, physical interface 432 provides one or more Ethernet interfaces (e.g. Gigabit Ethernet or other Ethernet variant) and may include interfaces that use optical and/or electrical signaling to send and receive data. Physical interface 432 is typically at the edge of the PHY 410, just before packets exit PHY 410 on to the network medium.

Clock 434 is a local clock which provides a timing signal for operations in PHY 410. Clock 434 may be based upon a physical or logical clock. According to one embodiment, clock 434 is derived from a oscillator local to PHY 410 or network entity (not shown) that includes PHY 410. According to another embodiment, clock 434 is based upon a logical clock recovered from data stream.

Timestamp generator 436, upon being triggered by selected events such as, for example, the receipt of a PTP message or the transmitting of a PTP message, operates to determine a timestamp. Timestamp generator 436 captures the current time from clock 434. Based upon the type of message for which the timestamp is captured, timestamp generator 436 may either store the timestamp in a memory for later use or may record (e.g. write) the timestamp in the packet.

IEEE 1588 timestamp insert and packet detection module 438 operates to detect the type of the incoming or outgoing message and to insert (e.g. record or write) the timestamp in the incoming or outgoing packet.

Timestamp memory controller 444 operates to control access to timestamp memory 442. According to an embodiment, timestamp memory controller 444 can be configured to access timestamp entries based upon a combination of fields from the PTP common header 320 (e.g. domain number and sequence ID). Timestamp memory 442 is configured to store timestamps captured by timestamp generator 436 for ingress and egress packets. Other information from the packets that can be used to correlate packets of a message exchange (e.g. domain number and sequence ID from the common header 320) may also be stored in association with the timestamps. According to an embodiment, timestamp memory 442 is configured as a first-in-first-out (FIFO) buffer.

Timestamp memory controller 444 may also include logic to handle receiving out of order accesses to the information stored in timestamp memory 442. For example, upon receiving a request to access a timestamp having a later sequence ID than the lowest sequence ID in timestamp memory 442, memory controller 444 may invalidate all entries that are associated with sequence IDs that are lower than the requested later sequence ID.

Communication between PHY 410 and MAC 416 occurs over a host interface 440. Data (e.g. packets) as well as control can be communicated over host interface 440. Host interface 440 may also be referred to as MII and/or MDIO interface.

Figure 5:
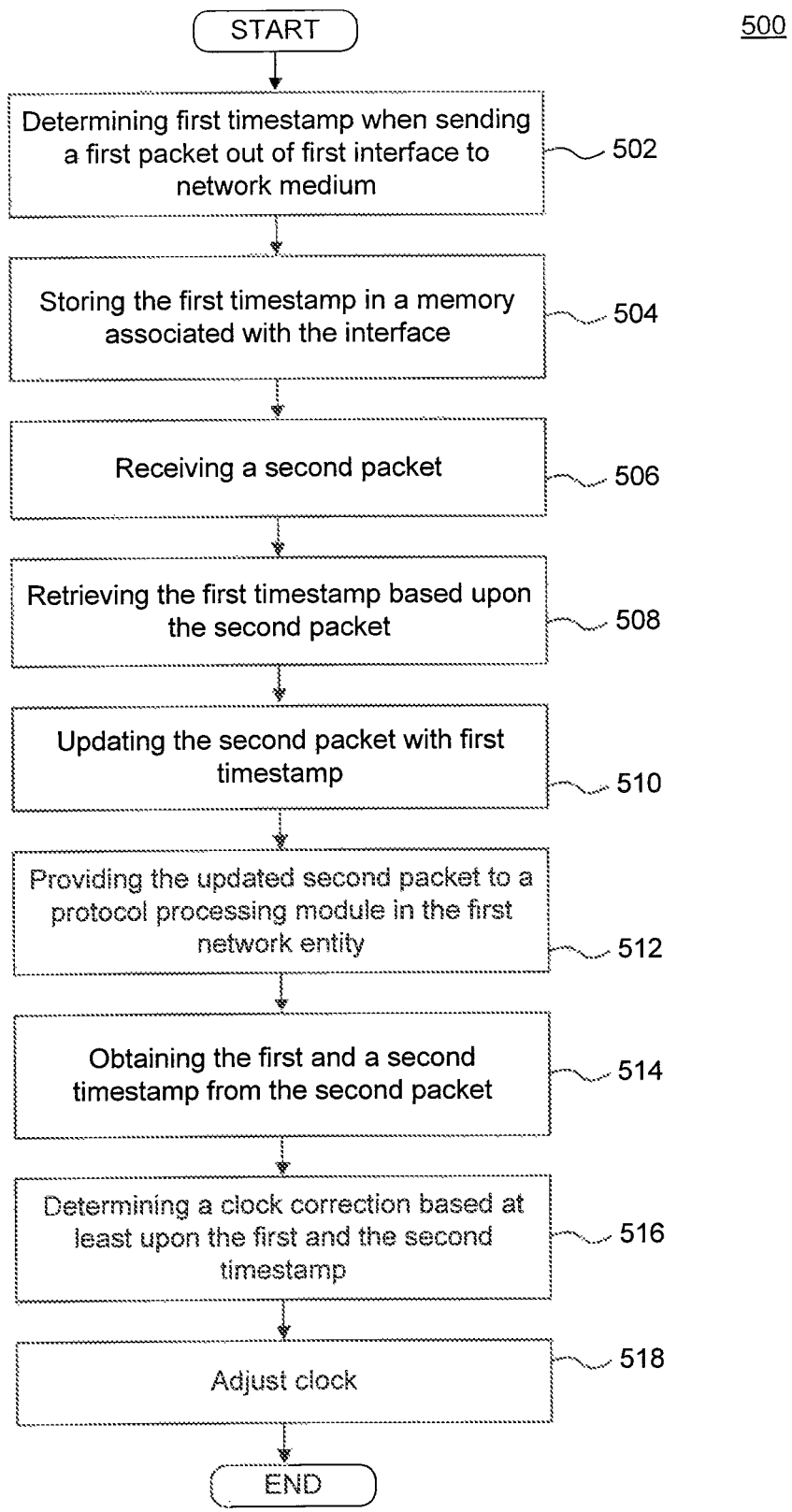
FIG. 5 illustrates a method synchronizing timing at a slave clock based upon PTP, in accordance with an embodiment.

FIG. 5 illustrates a method 500 for synchronizing timing at a network node based upon a message exchange with another network node, in accordance with an embodiment. In embodiments, method 500 may be performed with steps 502-518 in the order shown, or in another order. In some embodiments, one or more of steps 502-518 may not be performed. According to an embodiment, method 500 may be performed by a slave node during synchronizing itself to a master node in accordance with the IEEE 1588 protocol. For example, method 500 may be performed by a slave node, such as slave 204 shown in FIG. 2, during a message exchange, such as the message exchanges 100 or 101 for timing synchronization, with a master node 202. Using method 500, slave 204 may obtain the T3 timestamp inband with exchanged IEEE 1588 messages, instead of having to access a local memory in the PHY over a relatively slow host interface.

Method 500 begins at operation 502. At operation 502, a timestamp corresponding to the time at which a packet is transmitted on to a network is determined. In order to ensure that the timestamp reflects the precise time at which the complete packet is transmitted on to the network, the timestamp is determined at or very close to the physical interface. For example, instead of capturing the timestamp when an outgoing packet is enqueued at the MAC layer, the timestamp is captured at the physical interface when the packet is actually transmitted from the physical interface. By obtaining the timestamp at or very close to the physical interface, any delays that occur between when a packet is enqueued for transmission (e.g. at the MAC layer) and the actual transmission are eliminated or substantially reduced.

In the example embodiment using IEEE 1588, a slave node transmits a DELAY_REQ packet to a master node. A timestamp T3, which corresponds to the time at which the DELAY_REQ is transmitted on to the network, is determined by the slave node. If the network is an Ethernet, for example, there may be some delay between the time that the DELAY_REQ is enqueued for transmission at the MAC layer and its actual transmission. As the message exchange is directed to measuring the propagation delay between the slave and master nodes at a high accuracy level (e.g. in sub-microseconds or nanoseconds), any inaccuracies in timestamps due to such delays can be significant. By determining the timestamp at or very close to the physical interface, timestamp inaccuracy due to such delays are minimized.

The determination of the timestamp may be performed by a timestamping module (e.g. timestamp generator 436) in the PHY hardware based upon a local clock. The timestamping module may be triggered to capture a timestamp upon the PHY detecting the transmission of a predetermined type of message. For example, the timestamping module may be triggered each time the transmission of the IEEE 1588 packet from the PHY is detected.

At operation 504, the determined timestamp is stored in a memory (e.g. timestamp memory 442) associated with the physical interface through which the packet was transmitted. According to an embodiment, the timestamp is stored in a FIFO memory located on a PHY which includes the physical interface. The timestamp can be stored in a FIFO in a manner that the entry can be accessed based upon field values of the packet for which the timestamp was determined. Other organizations of the memory associated with the physical interface are possible, for example, the memory may include a content addressable memory (CAM) to store the identifier associated with each timestamp.

In the example embodiment using IEEE 1588, the T3 timestamp is stored in a FIFO memory such that it is indexed based upon one or more fields of the header of the packet for which the timestamp was determined. For example, the stored entry may include, in addition to the timestamp, the domain number and sequence ID from the common header of the PTP packet for which the timestamp was determined. In some embodiments, in addition to the domain number and sequence ID, the source port ID from the common header is also stored along with the timestamp.

At operation 506, a second packet is received at the physical interface, where the second packet is responsive to the first packet transmitted at operation 502. In accordance with the example embodiment using IEEE 1588, the second packet may be the DELAY_RSP sent by the master node in response to receiving the DELAY_REQ from the slave node.

At operation 508, the timestamp that was stored at operation 506 is retrieved. The timestamp is retrieved based upon information from the received second packet. In the example embodiment using IEEE 1588, the domain number, sequence ID and source port ID from the common header of the DELAY_RSP may be used to retrieve the stored timestamp from the memory. In accordance with IEEE 1588, in PTP packets belonging to one synchronization cycle (e.g. corresponding SYNC, SYNC_FOLLOWUP, DELAY_REQ and DELAY_RSP) use the domain number, sequence ID and source port ID in their headers.

At operation 510, the received second packet is updated with the retrieved timestamp information. Updating the received second packet may be performed by writing the timestamp in the second packet. In the example embodiment using IEEE 1588, the retrieved timestamp (T3) is written in a reserved field of the common header of the DELAY_RSP message. The updating of the header can also include updating one or more checksum (e.g. cyclic redundancy check) values includes in the header and/or packet.

At operation 512, the received second packet updated with the timestamp information is provided to a protocol processing module. For example, the updated second packet is input to a ingress packet buffer from which it is subsequently retrieved for processing by one or more protocol modules. The protocol modules may include processing for UDP/IP packets. The protocol modules may also include processing for higher layer protocols, such as, but not limited to IEEE 1588.

A higher layer protocol entity, such as PTP 1588 module 420, can selectively control whether T3 is captured and held in a local memory of the PHY until the corresponding response is received. For example, when the DELAY_REQ is generated by module 420, a reserved field in the common header (e.g. reserved(1) shown in FIG. 3B) can be configured to indicate that T3 should be captured and held in a local memory of the PHY until the corresponding response is received. Alternatively, the reserved(1) field can be interpreted by the PHY such that the PHY stores the captured T3 in a local memory and informs the processor, which then causes the MAC or higher layer protocols to read the local memory of the PHY to obtain T3. The MAC or higher layer protocols then hold T3 until the corresponding T4 is received in order to perform the synchronization. However, the read of the local memory of the PHY by the processor (e.g., MAC or higher layer protocols) occurs over the host interface (e.g. 440) which may cause delays and also place an unnecessary burden on the processor.

In embodiments of the present invention, the need for host interface access by the processor to obtain T3 (or other timestamp) is eliminated by holding T3 in local memory of the PHY until the corresponding response is received, and then recording T3 in the header of that response.

At operation 514, the protocol processing module obtains the first timestamp and a second timestamp from the received second packet. In the example embodiment using IEEE 1588, a protocol module extracts the T3 timestamp and a T4 timestamp from the DELAY_RSP packet. The T3 and T4 timestamps represent the egress and ingress times, respectively, of the corresponding DELAY_REQ packet. The T4 timestamp is captured by the master node upon ingress of the DELAY_REQ, and recorded in the DELAY_RSP before transmitting the DELAY_RSP to the slave node. According to an embodiment, T3 is extracted from the common header and T4 is obtained from the DELAY_RSP body.

At operation 516, a correction for a clock is determined based at least upon the obtained first and second timestamps. In the example embodiment using IEEE 1588, a correction is determined for the local clock at the slave node. The correction is based upon the T3 and T4 timestamps, and may further be based upon a T1 and a T2 timestamp acquired earlier.

At operation 518, the clock is adjusted based upon the determined adjustment.

Figure 6:
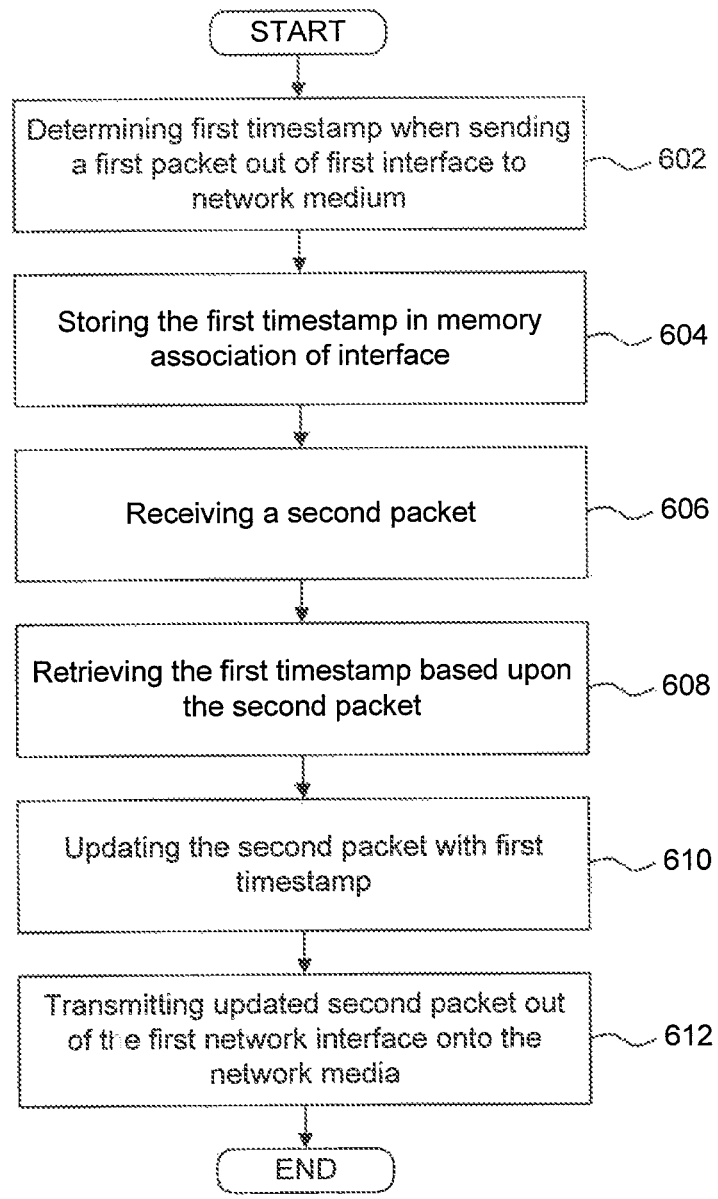
FIG. 6 illustrates a method for a master clock to transmit egress timestamp, in accordance with an embodiment.

FIG. 6 illustrates a method 600 for a master clock to transmit egress timestamp, in accordance with an embodiment. In embodiments, method 600 may be performed with steps 602-612 in the order shown, or in another order. In some embodiments, one or more of steps 602-612 may not be performed. According to an embodiment, method 600 may be performed by a master node during synchronizing by a slave node in accordance with the IEEE 1588 protocol. For example, method 600 may be performed by a master node, such as master 202 shown in FIG. 2, during a message exchange, such as the message exchanges 100 or 101 for timing synchronization, with a slave node 204. Using method 600, master 202 may obtain the T1 timestamp for transmission with the SYNC_FOLLOWUP message without having to access a local memory in the PHY over a relatively slow host interface.

Method 600 begins with operation 602. At operation 602, a timestamp is determined. The timestamp corresponds to the time that a packet is transmitted on to a network. In order to ensure that the timestamp precisely reflects the time at which the complete packet is transmitted on to the network, the timestamp is captured at or very close to the physical interface.

At operation 604, the determined timestamp is stored in a memory associated with the physical interface through which the packet was transmitted. According to an embodiment, the timestamp is stored in a FIFO memory. The timestamp can be stored in a FIFO in a manner that the entry can be accessed based upon field values of the packet for which the timestamp was determined.

In an example embodiment using IEEE 1588, the T1 timestamp is stored in a FIFO memory upon a SYNC packet being transmitted by the master such that the stored timestamp is indexed based upon one or more fields of the header of the packet for which the timestamp was determined. For example, the stored entry may include, in addition to the timestamp, the domain number and sequence identifier from the common header of the PTP packet for which the timestamp was determined. In some embodiments, in addition to the domain number and sequence identifier, the source port identifier from the common header is also stored along with the timestamp.

At operation 606, a second packet is received at the physical interface to be transmitted out of the physical interface. In accordance with the example embodiment using IEEE 1588, the second packet may be the SYNC_FOLLOWUP sent by the master node immediately following the SYNC.

At operation 608, the timestamp stored at operation 604 is retrieved. The timestamp is retrieved based upon information from the received second packet (e.g. SYNC_FOLLOWUP). In the example embodiment using IEEE 1588, the domain number, sequence identifier and source port identifier from the common header of the SYNC_FOLLOWUP may be used to retrieve the stored timestamp from the memory.

At operation 610, the second packet is updated to include the retrieved timestamp. In the example embodiment using IEEE 1588, the SYNC_FOLLOWUP packet is updated by writing the T1 timestamp in the PTP data.

At operation 612, the updated second packet is transmitted out of the physical interface.

The representative functions of the communications device described herein may be implemented in hardware, software, or some combination thereof. For instance, processes 500 and 600 can be implemented using computer processors, computer logic, ASIC, FPGA, DSP, etc., as will be understood by those skilled in the arts based on the discussion given herein. Accordingly, any processor that performs the processing functions described herein is within the scope and spirit of the present invention.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described example embodiments, but should be defined only in accordance with the following claims and their equivalents.

What is claimed is:

1. A method, comprising:
   determining an egress timestamp corresponding to a time at which a first packet is transmitted from a physical interface of a first network entity;
   storing the egress timestamp and an identifier of the first packet in a memory associated with the physical interface;
   receiving at the physical interface a second packet from a second network entity;
   retrieving the egress timestamp from the memory based upon the received second packet;
   updating the second packet with the retrieved egress timestamp; and
   providing the updated second packet for protocol processing in the first network entity.

2. The method of claim 1, wherein the second packet is transmitted by the second network entity in response to receiving the first packet.

3. The method of claim 1, wherein the retrieving comprises:
   determining an identifier for the received second packet; and
   accessing the memory using the determined identifier.

4. The method of claim 3, wherein the determining an identifier comprises:
   combining a plurality of header fields from the received second packet to form the identifier.

5. The method of claim 1, wherein the updating comprises:
   writing the retrieved egress timestamp in a reserved field in a header of the received second packet.

6. The method of claim 5, wherein the updating further comprises:
   calculating a checksum after writing the retrieved egress timestamp; and
   writing the checksum in the received second packet.

7. The method of claim 1, wherein the memory and the physical interface are on a network physical layer chip.

8. The method of claim 1, wherein the retrieving and the updating are performed in a network physical layer chip.

9. The method of claim 1, wherein the providing comprises:
   sending the updated second packet from a network physical layer to a higher layer in response to a request over a host interface to the physical interface.

10. The method of claim 1, further comprising:
    obtaining the egress timestamp and an ingress timestamp from the provided second packet; and
    determining a clock correction for the first network entity based at least upon the obtained egress and ingress timestamps.

11. The method of claim 10, wherein the ingress timestamp corresponds to a time at which the first packet is received at the second network entity.

12. The method of claim 1, wherein the first and second packets are IEEE 1588 packets, and wherein the egress timestamp corresponds to an egress time of a delay request packet.

13. A method, comprising:
    determining an egress timestamp corresponding to a time at which a first packet is transmitted from a physical interface of a first network entity;
    storing the egress timestamp in a memory associated with the physical interface;
    receiving a second packet at the physical interface;
    retrieving the egress timestamp from the memory based upon the received second packet;
    updating the second packet with the retrieved egress timestamp; and
    transmitting the updated second packet from the physical interface on to a network media.

14. The method of claim 13, wherein the retrieving and the updating are performed in a network physical layer chip.

15. The method of claim 13, wherein the retrieving comprises:
    determining an identifier for the received second packet; and
    accessing the memory using the determined identifier.

16. A system, comprising:
    (a) a network physical layer (PHY) configured to be accessed by a central processing unit (CPU) using a host interface, the network PHY comprising:
       a physical interface configured to transmit packets to and receive packets from a network medium; and
       a timestamp memory,
       and the network PHY being further configured to:
          determine an egress timestamp corresponding to a time at which a first packet is transmitted from the physical interface to the network medium;
          store the egress timestamp in the timestamp memory;
          receive at the physical interface a second packet from a second network entity;
          retrieve the egress timestamp from the timestamp memory based upon the received second packet;
          update the second packet with the retrieved egress timestamp; and
          provide the updated second packet for protocol processing on the CPU.

17. The system of claim 16, further comprising:
    (a) a system memory coupled to the CPU; and
    (b) a protocol processing module configured to execute on the CPU, and further configured to:
       receive the second packet from the network PHY; and
       obtain the egress timestamp and one or more other timestamps from the second packet.

18. The system of claim 17, wherein the protocol processing module is further configured to:
    obtain the egress timestamp and an ingress timestamp from the provided second packet; and
    determine a clock correction for the first network entity based at least upon the obtained egress and ingress timestamps.

19. The system of claim 18, wherein the ingress timestamp corresponds to a time the first packet is received at the second network entity.

20. The system of claim 16, wherein the second packet is transmitted by the second network entity in response to the first packet.

* * * * *

UNITED STATES PATENT AND TRADEMARK OFFICE
CERTIFICATE OF CORRECTION

PATENT NO.       : 8,879,586 B2                                Page 1 of 1
APPLICATION NO.  : 13/722985
DATED            : November 4, 2014
INVENTOR(S)      : Jeffrey Tzeng It is certified that error appears in the above-identified patent and that said Letters Patent is hereby corrected as shown below:

In the Claims

Column 14, line 27, please replace "(a) a network" with --a network--.

Column 14, line 47, please replace "(a) a system" with --a system--.

Column 14, line 48, please replace "(b) a protocol" with --a protocol--.

Signed and Sealed this
Fifth Day of May, 2015

Michelle K. Lee
*Director of the United States Patent and Trademark Office*